US012223676B2

United States Patent
Wang et al.

(10) Patent No.: US 12,223,676 B2
(45) Date of Patent: Feb. 11, 2025

(54) METHOD FOR POSE CORRECTION AND HOST

(71) Applicant: HTC Corporation, Taoyuan (TW)

(72) Inventors: Yun-Ting Wang, Taoyuan (TW); Sheng-Hui Tao, Taoyuan (TW)

(73) Assignee: HTC Corporation, Taoyuan (TW)

( * ) Notice: Subject to any disclaimer, the term of this patent is extended or adjusted under 35 U.S.C. 154(b) by 385 days.

(21) Appl. No.: 17/824,906

(22) Filed: May 26, 2022

(65) Prior Publication Data

US 2024/0005553 A1    Jan. 4, 2024

(51) Int. Cl.
G06K 9/00 (2022.01)
G02B 27/00 (2006.01)
G02B 27/01 (2006.01)
G06T 7/73 (2017.01)

(52) U.S. Cl.
CPC ............ G06T 7/74 (2017.01); G02B 27/0093 (2013.01); G02B 27/017 (2013.01); G02B 2027/0138 (2013.01); G02B 2027/0141 (2013.01)

(58) Field of Classification Search
CPC ......... G06T 7/74; G06T 7/73; G02B 27/0093; G02B 2027/0138
See application file for complete search history.

(56) References Cited

U.S. PATENT DOCUMENTS

| 2016/0260251 | A1  | 9/2016  | Stafford et al. |
| 2019/0362157 | A1* | 11/2019 | Cambias ............... G06V 10/255 |
| 2021/0318122 | A1* | 10/2021 | Kojima ................ G05D 1/0274 |
| 2021/0375054 | A1* | 12/2021 | Pan ........................ G06T 19/006 |
| 2022/0277476 | A1* | 9/2022  | Sagong .................... G06F 3/011 |

FOREIGN PATENT DOCUMENTS

| CN | 109410303 | 3/2019 |
| TW | 201915445 | 4/2019 |
| TW | 202020628 | 6/2020 |

OTHER PUBLICATIONS

"Office Action of Taiwan Counterpart Application", issued on Nov. 30, 2022, p. 1-p. 10.

* cited by examiner

*Primary Examiner* — Molly Wilburn
*Assistant Examiner* — Aidan Keup
(74) *Attorney, Agent, or Firm* — JCIPRNET (57) ABSTRACT

The embodiments of the disclosure provide a method for pose correction and a host. The method includes: obtaining a first image; in response to determining that a first reference object of at least one reference object exists in the first image, determining a first relative position between the host and the first reference object; obtaining a first reference pose based on the first relative position; and correcting a pose of the host based on the first reference pose.

17 Claims, 6 Drawing Sheets

METHOD FOR POSE CORRECTION AND HOST

BACKGROUND

1. Field of the Invention

The present disclosure generally relates to a tracking mechanism, in particular, to a method for pose correction and a host.

2. Description of Related Art

In robot localization, estimating pose and providing accurate pose are the most important things. However, it's easy to occur pose drifting after tracking the pose of the robot for a long time. Moreover, pose drifting errors would be accumulated as time goes on.

Figure 1A:
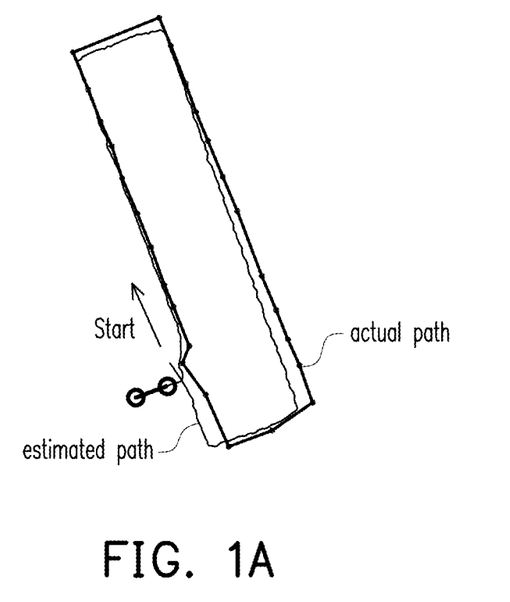
FIG. 1A and FIG. 1B show different scenarios of tracking error accumulation.
Figure 1B:
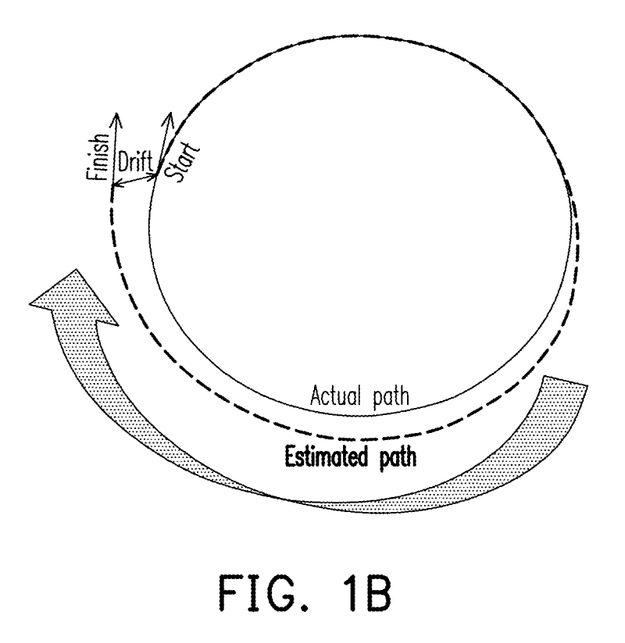

See FIG. 1A and FIG. 1B, which show different scenarios of tracking error accumulation. In FIG. 1A, it is assumed that a to-be tracked object (e.g., a head-mounted display (HMD)) is moving along the actual path, and the estimated path is the path estimated by the to-be tracked object itself.

As can be seen from FIG. 1A, at the beginning of the movement of the to-be-tracked object, the estimated path is close to the estimated path, which means that the issue of pose drifting is minor.

However, as the to-be-tracked object moves farther, the estimated path is gradually drifted from the actual path, which represents that the pose drifting errors would be accumulated as time goes on. Same situation occurs in the scenario of FIG. 1B.

SUMMARY OF THE INVENTION

Accordingly, the disclosure is directed to a method for pose correction and a host, which may be used to solve the above technical problems.

The embodiments of the disclosure provide a method for pose correction, adapted to a host, including: obtaining a first image; in response to determining that a first reference object of at least one reference object exists in the first image, determining a first relative position between the host and the first reference object; obtaining a first reference pose based on the first relative position; and correcting a pose of the host based on the first reference pose.

The embodiments of the disclosure provide a host including a storage circuit and a processor. The storage circuit stores a program code. The processor is coupled to the non-transitory storage circuit and accesses the program code to perform: obtaining a first image; in response to determining that a first reference object of at least one reference object exists in the first image, determining a first relative position between the host and the first reference object; obtaining a first reference pose based on the first relative position; and correcting a pose of the host based on the first reference pose.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 2:
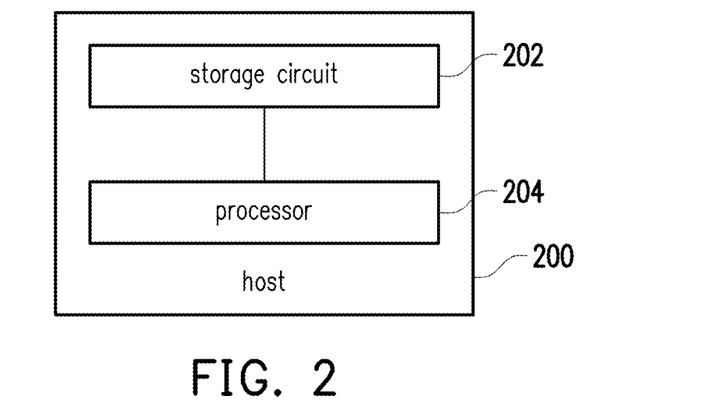
FIG. 2 shows a schematic diagram of a host according to an embodiment of the disclosure.

See FIG. 2, which shows a schematic diagram of a host according to an embodiment of the disclosure. In various embodiments, the host 200 can be any electronic device such as a smart device and/or a computer device. In some embodiments, the host 200 can be an HMD of a reality system (e.g., a VR system, an augmented reality (AR) system, a mixed reality (MR) system, or the like). In some embodiments, the host 200 can be a (standalone) HMD providing a visual content (e.g., a VR content) for the user/wearer to see, but the disclosure is not limited thereto. In other embodiments, the host 200 can be an automated guided vehicle or other autonomous robots, but the disclosure is not limited thereto.

In FIG. 2, the host 200 includes a storage circuit 202 and a processor 204. The storage circuit 202 is one or a combination of a stationary or mobile random access memory (RAM), read-only memory (ROM), flash memory, hard disk, or any other similar device, and which records a program code and/or a plurality of modules that can be executed by the processor 204.

The processor 204 is coupled with the storage circuit 202, and the processor 204 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In some embodiments, the host 200 can be configured to perform tracking functions, such as inside-out tracking and/or outside-in tracking, to track the pose of the host 200. In some embodiments, the host 200 can be disposed with one or more cameras (e.g., the front camera) for capturing the images of the environment where the host 200 locates. In one embodiment, the host 200 can track the pose of the host 200 based on the captured images by performing, for example, simultaneous localization and mapping (SLAM). In some embodiments, the pose of the host 200 can be characterized by one or more component of the host 200 on one or more degree of freedom (DOF), such as the so-called 6DOF of the host 200, but the disclosure is not limited thereto.

In the embodiments of the disclosure, the processor 204 accesses the modules and/or the program code stored in the storage circuit 202 to implement the method for pose correction provided in the disclosure, which would be further discussed in the following.

Figure 3:
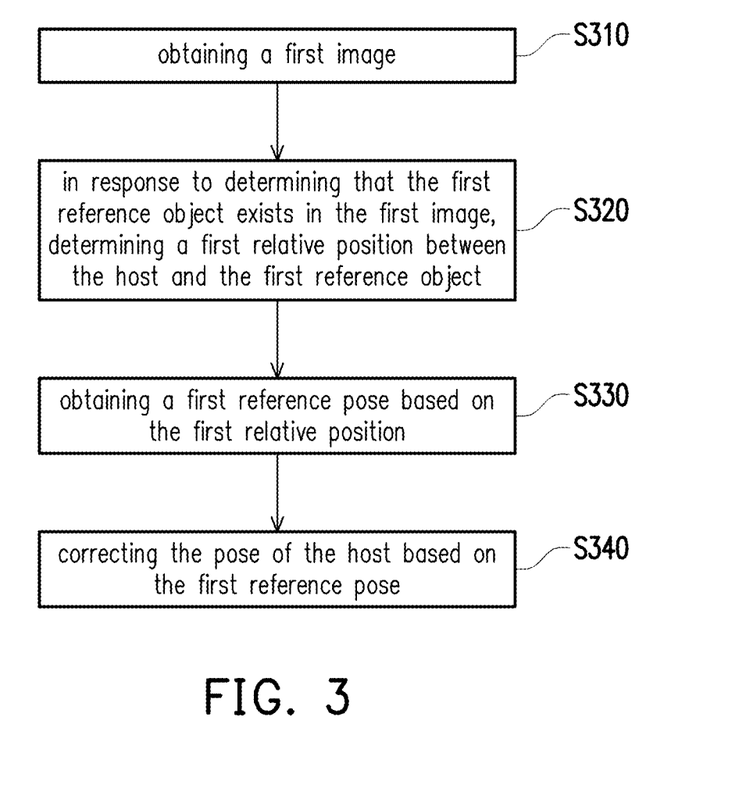
FIG. 3 shows a flow chart of the method for pose correction according to an embodiment of the disclosure.

See FIG. 3, which shows a flow chart of the method for pose correction according to an embodiment of the disclosure. The method of this embodiment may be executed by the host 200 in FIG. 2, and the details of each step in FIG. 3 will be described below with the components shown in FIG. 2. In addition, for better explaining the concept of the disclosure, FIG. 4 would be used as an example, wherein FIG. 4 shows a schematic diagram of an application scenario according to an embodiment of the disclosure.

Figure 4:
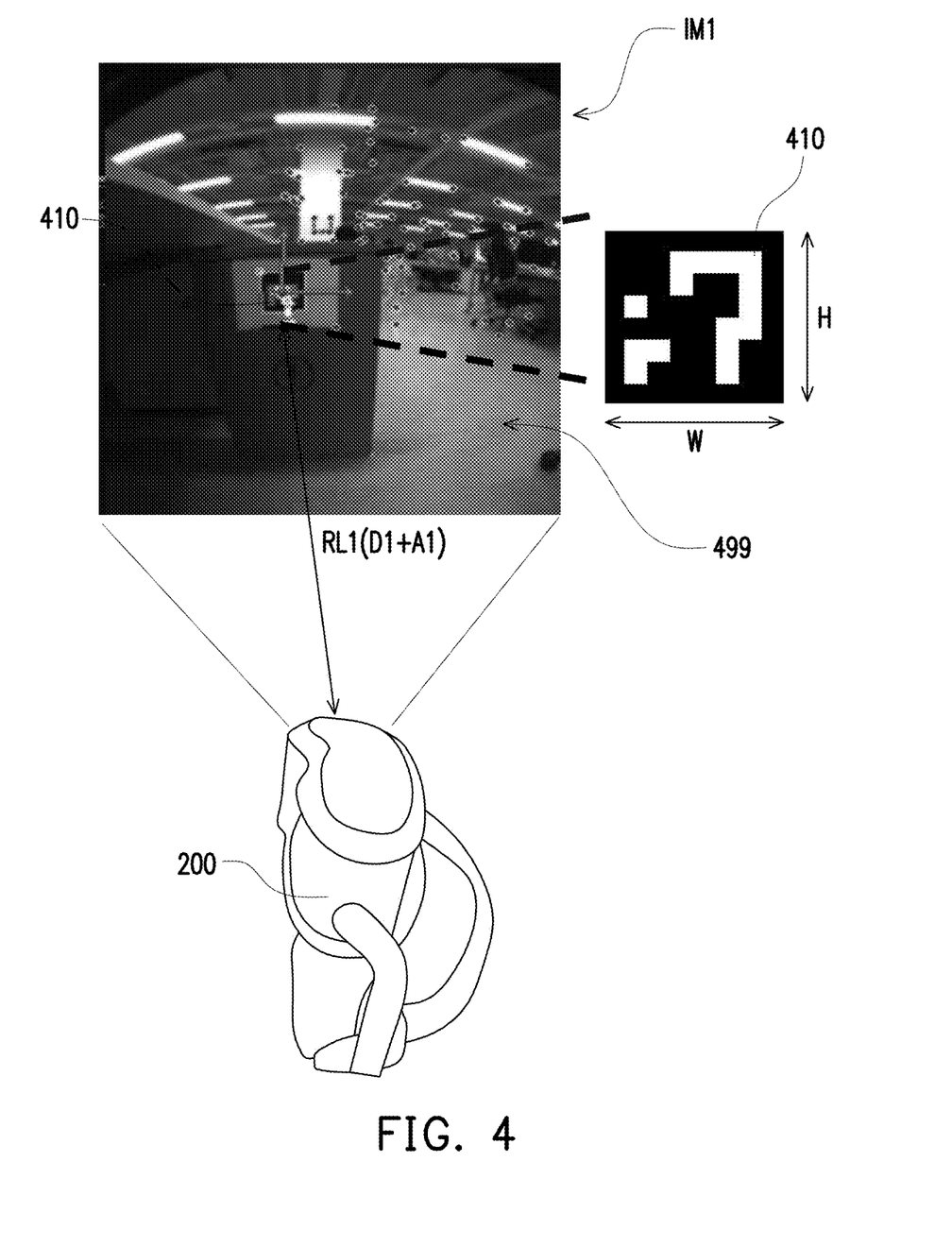
FIG. 4 shows a schematic diagram of an application scenario according to an embodiment of the disclosure.

In FIG. 4, the host 200 (e.g., an HMD) is assumed to move in a specific field 499, and the host 200 can capture images when moving around in the specific field 499.

In step S310, the processor 204 obtains a first image IM1, which may be one of the images captured by the host 200.

In one embodiment, the processor 204 determines whether one or more reference object exists in the first image IM1. In the embodiments of the disclosure, the reference object(s) can be some objects particularly disposed in the environment of the specific field 499 as a reference for pose correction. In various embodiments, the appearances of the reference objects can be different or the same.

In the scenario of FIG. 4, a first reference object 410 can be one of the reference objects, which may be implemented as an object printed with specific patterns. In other embodiments, the reference objects can be any object (e.g., furniture, a (electronic) device, decorations, appliance, etc.) predetermined by the designer, but the disclosure is not limited thereto. In some embodiments, the positions and the orientations of the reference objects are fixed in the specific field 499.

In one embodiment, for each of the reference objects, a corresponding look-up table can be constructed in advance (such as at an installing phase of the specific field 499). For example, a look-up table corresponding to one of the reference objects (referred to as a specific reference object) can be exemplarily shown as the following Table 1.

TABLE 1

| data combination | reference relative position | | reference area | predetermined pose |
|---|---|---|---|---|
| | distance | angle | | |
| 1 | 50 cm | 0 degree | 100 pixels | Pose1 |
| 2 | 100 cm | 30 degrees | 50 pixels | Pose2 |
| 3 | 150 cm | 60 degrees | 25 pixels | Pose3 |
| ... | ... | ... | ... | ... |

As can be seen in the above, Table 1 includes multiple data combinations, and each data combination includes a reference relative position, a reference area, and a reference predetermined pose. In the embodiments of the disclosure, the reference relative position of each data combination can be characterized by a distance between a reference device and the specific reference object and an angle of the reference device with respect to the specific reference object. In addition, the reference area of each data combination is the area occupied by the specific reference object in an image captured by the reference device when the relative position between the reference device and the specific reference object matches the corresponding reference relative position.

In one embodiment, the reference device can be another HMD used to measure the reference area and the predetermined pose of each data combination. For example, during constructing the data combination 1 of the look-up table of the specific reference object, the reference device can be set to be in the corresponding reference relative position (i.e., spaced from the specific reference object by 50 cm and having an angle of 0 degree with respect to the specific reference object) and capture an image of the specific reference object. In this case, the current pose of the reference device can be recorded as Pose1, and the area occupied by the specific reference object in the captured image can be recorded as the reference area (e.g., 100 pixels) of the data combination 1.

For example, during constructing the data combination 2 of the look-up table of the specific reference object, the reference device can be set to be in the corresponding reference relative position (i.e., spaced from the specific reference object by 100 cm and having an angle of 30 degrees with respect to the specific reference object) and capture an image of the specific reference object. In this case, the current pose of the reference device can be recorded as Pose2, and the area occupied by the specific reference object in the captured image can be recorded as the reference area (e.g., 50 pixels) of the data combination 2. For another example, during constructing the data combination 3 of the look-up table of the specific reference object, the reference device can be set to be in the corresponding reference relative position (i.e., spaced from the specific reference object by 150 cm and having an angle of 60 degrees with respect to the specific reference object) and capture an image of the specific reference object. In this case, the current pose of the reference device can be recorded as Pose3, and the area occupied by the specific reference object in the captured image can be recorded as the reference area (e.g., 25 pixels) of the data combination 3. Other data combinations in Table 1 can be constructed/measured/generated based on the similar principle.

For each of the reference objects, the corresponding look-up table can be constructed in advance based on the above teachings, and so as the first reference object 410.

In one embodiment, after obtaining the first image IM1, the processor 204 may determine whether any of the reference objects exists in the first image IM1. In the scenario of FIG. 4, it is assumed that the first reference object 410 is determined to be existing in the first image IM1, and hence the processor 204 can proceed to step S320.

In step S320, in response to determining that the first reference object 410 exists in the first image IM1, the processor 204 determines a first relative position RL1 between the host 200 and the first reference object 410.

In FIG. 4, the first relative position RL1 between the host 200 and the first reference object 410 is characterized by a first distance D1 between the host 200 and the first reference object 410 and a first angle A1 of the host 200 with respect to the first reference object 410.

In step S330, the processor 204 obtains a first reference pose based on the first relative position RL1. In one embodiment, the processor 204 obtains a first look-up table corresponding to the first reference object 410, wherein the first look-up table includes a plurality of first data combinations, and each first data combination includes a first reference relative position, a first reference area, and a first predetermined pose.

For better understanding the concept of the disclosure, Table would be assumed to be the first look-up table corresponding to the first reference object 410. In this case, the first data combinations may respectively correspond to the data combinations 1, 2, 3, etc.

Next, the processor 204 obtains a first specific data combination from the first data combinations based on the first relative position RL1, wherein the first reference relative position of the first specific data combination corresponds to the first relative position RL1.

For example, if the processor 204 determines that the first distance D1 is 50 cm and the first angle A1 is 0 degree, the processor 204 may determine that the data combination 1 in Table 1 is the first specific data combination. For another example, if the processor 204 determines that the first distance D1 is 100 cm and the first angle A1 is 30 degrees, the processor 204 may determine that the data combination 2 in Table 1 is the first specific data combination. For yet another example, if the processor 204 determines that the first distance D1 is 150 cm and the first angle A1 is 60 degrees, the processor 204 may determine that the data combination 3 in Table 1 is the first specific data combination, but the disclosure is not limited thereto.

Afterwards, the processor 204 determines the first predetermined pose of the first specific data combination as the first reference pose. For example, if the processor 204 determines that the data combination 1 in Table 1 is the first specific data combination, the processor 204 can correspondingly determine that Pose1 (i.e., the predetermined pose of the data combination 1) in Table 1 is the first reference pose. For another example, if the processor 204 determines that the data combination 2 in Table 1 is the first specific data combination, the processor 204 can correspondingly determine that Pose2 (i.e., the predetermined pose of the data combination 2) in Table 1 is the first reference pose. For yet another example, if the processor 204 determines that the data combination 3 in Table 1 is the first specific data combination, the processor 204 can correspondingly determine that Pose3 (i.e., the predetermined pose of the data combination 3) in Table 1 is the first reference pose, but the disclosure is not limited thereto.

In step S340, the processor 204 corrects the pose of the host 200 based on the first reference pose. In one embodiment, the processor 204 obtains at least one difference between the pose of the host 200 and the first reference pose and compensates the pose of the host 200 by the at least one difference.

In one embodiment, the at least one difference is characterized by at least one component difference on at least one DOF between the pose of the host 200 and the first reference pose.

For example, if the 6DOF of the pose of the host 200 is represented by (x-a, y-b, z-c, φ-d, θ-e, ψ-f) and the 6DOF of the first reference pose is represented by (x, y, z, φ, θ, ψ), the processor 204 may determine the difference between the pose of the host 200 and the first reference pose as (a, b, c, d, e, f). In this case, the processor 204 may correct the pose of the host 200 via compensating the pose of the host 200 by the (a, b, c, d, e, f), such that the compensated/corrected pose of the host 200 becomes (x, y, z, ψ, θ, ψ), but the disclosure is not limited thereto.

Accordingly, the embodiments of the disclosure can correct the pose of the host 200 when a reference object is detected in the captured image. In this case, when the host 200 moves around in the specific field 499, the pose of the host 200 can be corrected from time to time, and hence the issue of pose drifting error accumulation mentioned in the above can be mitigated.

In some embodiments, the specific field 499 where the host 200 moves can be distributed with multiple identical/different reference objects, and each of the reference object can be designed with a corresponding look-up table. In this case, whenever one reference object is detected by the host 200 in the captured image, the host 200 can obtain the relative position between the host 200 and this reference object and accordingly search for the corresponding predetermined pose in the look-up table of this reference object. Once the predetermined pose (e.g., the first reference pose) corresponding to the relative position between the host 200 and this reference object is obtained, the host 200 can correct the pose of the host 200 based on this predetermined pose.

In one embodiment, the processor 204 can further determine whether the pose of the host 200 needs to be corrected. See FIG. 5A, which shows a flow chart of the method for pose correction according to FIG. 3.

Figure 5A:
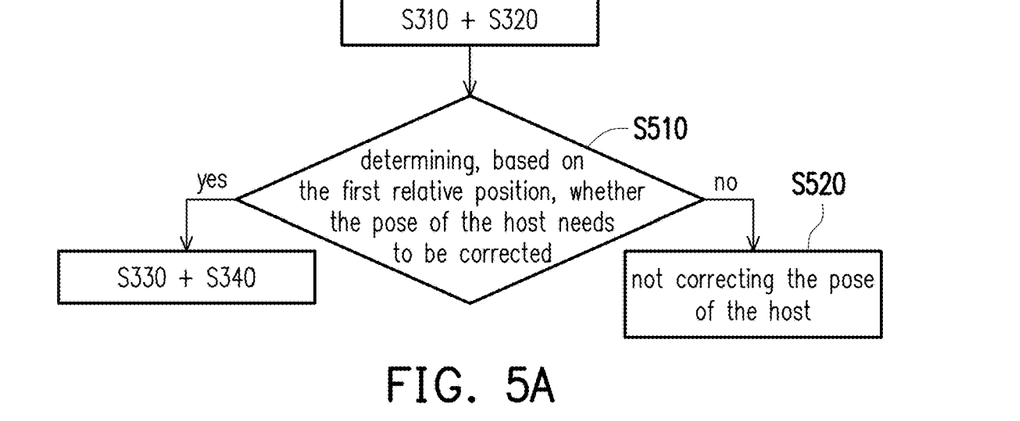
FIG. 5A shows a flow chart of the method for pose correction according to FIG. 3.

In FIG. 5A, after the processor 204 performs steps S310 and S320, the processor 204 can perform step S510 to determine, based on the first relative position RL1, whether the pose of the host 200 needs to be corrected. If yes, the processor 204 may proceed to steps S330 and S340 as taught in the above. If not, the processor 204 may proceed to step S520 to not correct the pose of the host 200.

Figure 5B:
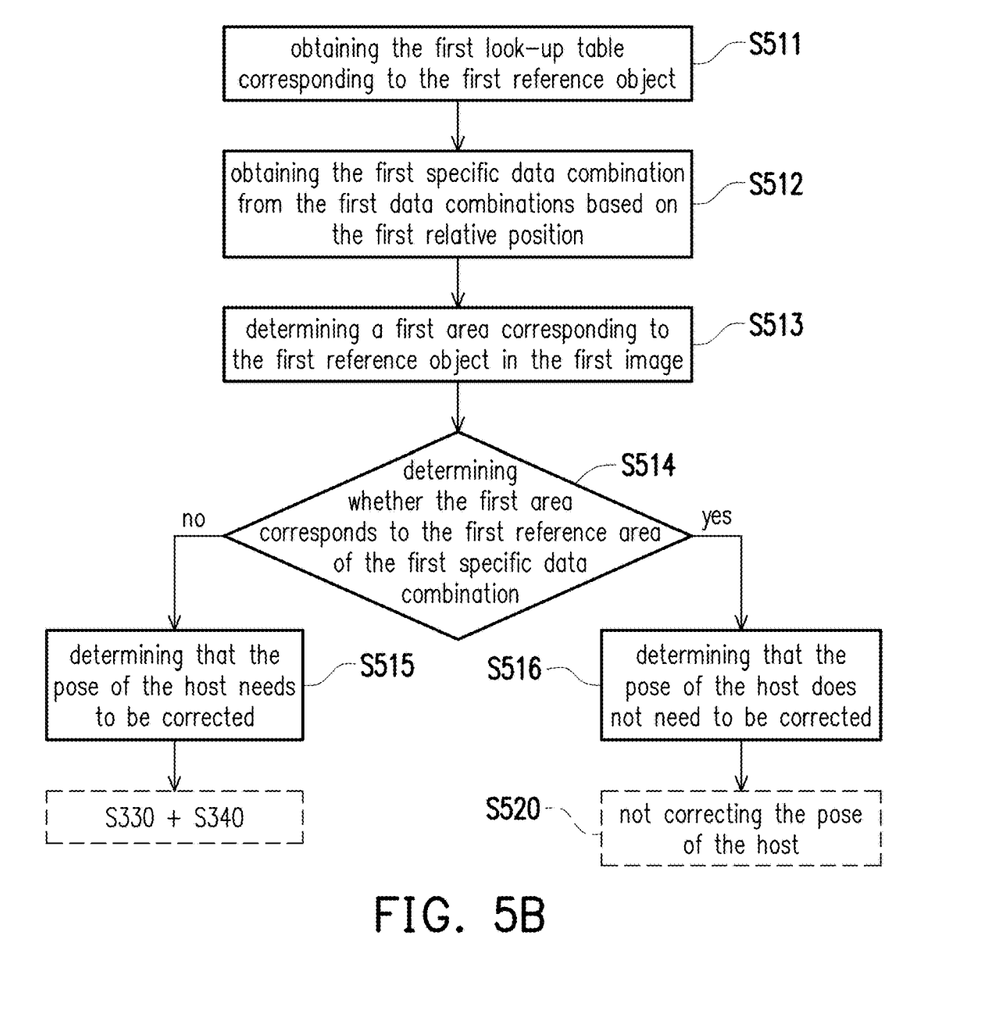
FIG. 5B shows a flow chart of determining whether the pose of the host needs to be corrected according to FIG. 5A.

See FIG. 5B, which shows a flow chart of determining whether the pose of the host needs to be corrected according to FIG. 5A. For better understanding, the scenario in FIG. 4 would be used as an example again.

In step S511, the processor 204 obtains the first look-up table (e.g., Table 1) corresponding to the first reference object 410. In step S512, the processor 204 obtains the first specific data combination from the first data combinations based on the first relative position RL1. Details of steps S511 and S512 can be referred to the above embodiments, which would not be repeated herein.

For facilitating the following discussion, the data combination 1 would be assumed to be the first specific data combination obtained in step S512, but the disclosure is not limited thereto. In this case, the first reference area of the first specific data combination would be 100 pixels according to Table 1.

In step S513, the processor 204 determines a first area corresponding to the first reference object 410 in the first image IM1. In one embodiment, the first area corresponding to the first reference object 410 in the first image IM1 is an area occupied by the first reference object 410 in the first image IM1. In FIG. 4, assuming that the width and height of the first reference object 410 in the first image IM1 is W and H, the processor 204 may determine that the first area as W×H pixels. For example, if W and H are both 10 pixels, the processor 204 may determine the first area as 100 pixels.

In other embodiments, the area occupied by the first reference object 410 in the first image IM1 may be irregularly shaped, and the processor 204 may accordingly count the pixels in the area occupied by the first reference object 410 in the first image IM1 to obtain the first area, but the disclosure is not limited thereto.

In step S514, the processor 204 determines whether the first area corresponds to the first reference area of the first specific data combination. If not, the processor 204 can proceed to step S515 to determine that the pose of the host 200 needs to be corrected; if yes, the processor 204 can proceed to step S516 to determine that the pose of the host 200 does not need to be corrected.

In one embodiment, the processor 204 can determine whether the first area is equal to the first reference area. If yes, the processor 204 can determine that the first area corresponds to the first reference area, or otherwise the processor 204 can determine that the first area does not correspond to the first reference area.

For example, if the first area is 100 pixels, the processor 204 may determine that the first area corresponds to the first reference area since the first area is equal to the considered first reference area (i.e., 100 pixels). For another example, if the first area is not 100 pixels, the processor 204 may determine that the first area does not correspond to the first reference area since the first area is not equal to the considered first reference area (i.e., 100 pixels), but the disclosure is not limited thereto.

In another embodiment, the processor 204 may determine that an area difference between the first area and the first reference area is larger than a threshold. If not, the processor 204 can determine that the first area corresponds to the first reference area, or otherwise the processor 204 can determine that the first area does not correspond to the first reference area.

For example, if the first area is 96 pixels and the threshold is 5 pixels, the processor 204 may determine that the first area corresponds to the first reference area since the area difference (i.e., 4 pixels) between the first area and the considered first reference area (i.e., 100 pixels) is not larger than the threshold. For another example, if the first area is 94 pixels and the threshold is 5 pixels, the processor 204 may determine that the first area does not correspond to the first reference area since the area difference (i.e., 6 pixels) between the first area and the considered first reference area (i.e., 100 pixels) is larger than the threshold, but the disclosure is not limited thereto.

After step S515, the processor 204 may perform steps S330 and S340, and the details of steps S330 and S340 can be referred to the above teachings.

On the other hand, after step S516, the processor 204 can proceed to step S520 to not correct the pose of the host 200.

In one embodiment, the processor 204 may determine whether any of the reference objects exists in each of the images captured by the camera.

In other embodiments, the processor 204 may determine to selectively detect whether the reference objects exist in the images.

For example, after processing/analysing the first image IM1, the processor 204 may determine a time difference and accordingly obtain a second image, wherein the second image is captured later than the first image by the time difference. That is, if the first image IM1 is captured at a timing point T1, the processor 204 may determine the image captured at a timing point T2 as the second image, wherein the timing point T2 is later than the timing point T1 by the time difference.

With the second image, the processor 204 may determine whether the second image includes the reference objects.

In one embodiment, in response to determining that at least one image is captured between the first image IM1 and the second image, the processor 204 may not determine whether the reference objects exist in each image between the first image IM1 and the second image. That is, the processor 204 may skip the detection for the reference objects in the images captured between the first image IM1 and the second image. Accordingly, the computation resources of the host 200 can be reduced.

In various embodiments, the time difference between the first image IM1 and the second image can be determined in different ways.

In one embodiment, the time difference between the first image IM1 and the second image can be determined to be fixed. That is, the processor 204 can periodically perform the detection for the reference objects. For example, the processor 204 may determine whether the reference objects exist in each of the first image IM1, the second image, a third image, a fourth image, and so on, wherein the third image and the fourth image are respectively captured at timing points T3 and T4. The time difference between the timing point T3 and T2 and the time difference between the timing point T4 and T3 are the same as the time difference between the timing points T2 and T1.

In one embodiment, the processor 204 can determine the time difference between the first image IM1 and the second image based on a distribution of the reference objects in the specific field 499 where the host 200 moves.

For example, if the reference objects are sparsely distributed in the specific field 499, the processor 204 may determine the time difference as a larger value since the reference objects are less possible to be detected in images that are close in time. On the other hand, if the reference objects are densely distributed in the specific field 499, the processor 204 may determine the time difference as a smaller value since the reference objects are possible to be detected in images that are close in time.

From another perspective, the time difference between the first image IM1 and the second image may be positively related to the (average) distances between the reference objects in the specific field 499.

In one embodiment, the processor 204 may determine the time difference between the first image IM1 and the second image based on a moving speed of the host 200 in the specific field 499 where the host 200 moves.

For example, if the host 200 moves slowly in the specific field 499, the processor 204 may determine the time difference as a larger value since the reference objects are less possible to be detected in images that are close in time. On the other hand, if the host 200 moves fast in the specific field 499, the processor 204 may determine the time difference as a smaller value since the reference objects are possible to be detected in images that are close in time.

From another perspective, the time difference between the first image IM1 and the second image may be negatively related to the moving speed of the host 200 in the specific field 499.

In one embodiment, the processor 204 may determine the time difference between the first image IM1 and the second image based on a predicted moving trace of the host 200. Specifically, the moving trace of the host 200 can be predicted based on the historical moving traces, and when the predicted moving trace of the host 200 is close to some of the reference objects in the specific field 499, the processor 204 may determine the time difference as a smaller value since the reference objects are possible to be detected in the following images.

On the other hand, when the predicted moving trace of the host 200 is far from any of the reference objects in the specific field 499, the processor 204 may determine the time difference as a larger value since the reference objects are less possible to be detected in the following images, but the disclosure is not limited thereto.

In one embodiment, in response to determining that the first reference object 410 also exists in the second image, the processor 204 can determine the first relative position RL1 between the host 200 and the first reference object 410. Afterwards, the processor 204 subsequently perform steps S330 and S340, and the details thereof can be referred to the above embodiments.

In other embodiments, in response to determining that other reference object exists in the second image, the processor 204 can accordingly correct the pose of the host 200 based on the above teachings.

In some embodiments where two or more reference objects exist in the first image IM1, the processor 204 can determine to correct the pose of the host 200 based on which of the reference object. Detailed discussions would be provided in the following.

Figure 6:
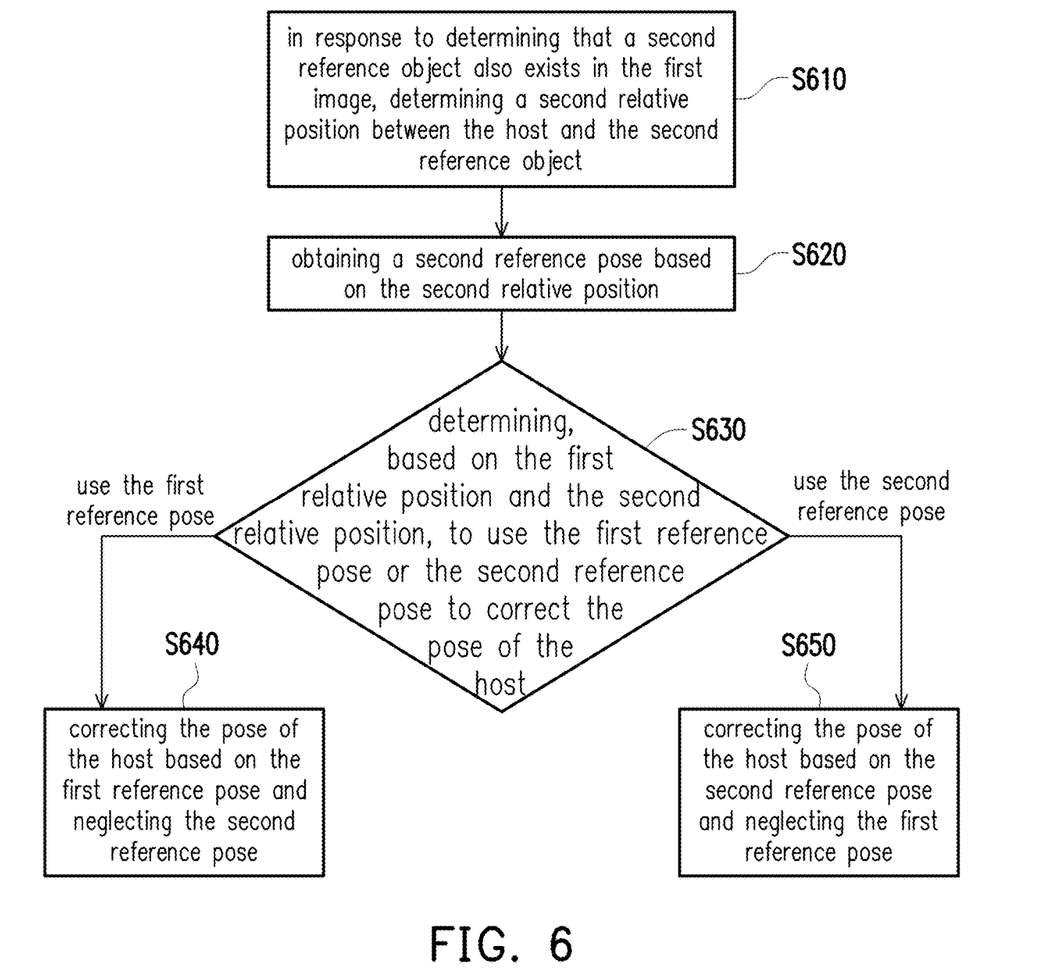
FIG. 6 shows a flow chart of the method for pose correction according to an embodiment of the disclosure.

See FIG. 6, which shows a flow chart of the method for pose correction according to an embodiment of the disclosure. For better understanding, FIG. 7 would be used as an example, wherein FIG. 7 is a schematic diagram of an application scenario according to an embodiment of the disclosure.

In the embodiment, after the processor 204 performs steps S310 to S330, the processor 204 can further determine whether other reference object(s) also exists in the first image IM1 before performing step S340.

In step S610, in response to determining that a second reference object 420 also exists in the first image IM1, the processor 204 determines a second relative position RL2 between the host 200 and the second reference object 420.

Figure 7:
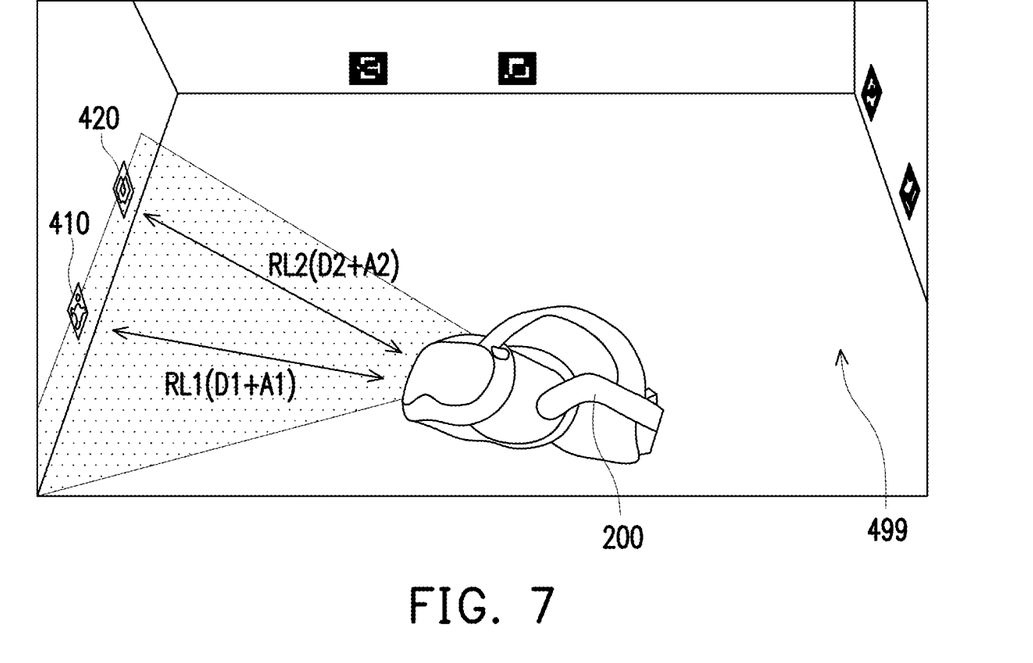
FIG. 7 is a schematic diagram of an application scenario according to an embodiment of the disclosure.

In FIG. 7, the second relative position RL2 between the host 200 and the second reference object 420 is characterized by a second distance D2 between the host 200 and the second reference object 420 and a second angle A2 of the host 200 with respect to the second reference object 420.

In step S620, the processor 204 obtains a second reference pose based on the second relative position RL2. In one embodiment, the processor 204 obtains a second look-up table corresponding to the second reference object 420. As mentioned in the above, each reference object may have the corresponding look-up table constructed in advance, and the second look-up table may be understood as the corresponding look-up table of the second reference object 420. In the embodiment, the second look-up table includes a plurality of second data combinations, and each second data combination comprises a second reference relative position, a second reference area, and a second predetermined pose, wherein the form of the second look-up table can be similar to Table 1. For better understanding, Table 1 would be used as an example of the second look-up table, but the disclosure is not limited thereto.

Next, the processor 204 obtains a second specific data combination from the second data combinations based on the second relative position RL2, wherein the second reference relative position of the second specific data combination corresponds to the second relative position.

For example, if the processor 204 determines that the second distance D2 is 50 cm and the second angle A2 is 0 degree, the processor 204 may determine that the data combination 1 in Table 1 is the second specific data combination. For another example, if the processor 204 determines that the second distance D2 is 100 cm and the second angle A2 is 30 degrees, the processor 204 may determine that the data combination 2 in Table 1 is the second specific data combination. For yet another example, if the processor 204 determines that the second distance D2 is 150 cm and the second angle A2 is 60 degrees, the processor 204 may determine that the data combination 3 in Table 1 is the second specific data combination, but the disclosure is not limited thereto.

Afterwards, the processor 204 determines the second predetermined pose of the second data combination as the second reference pose. For example, if the processor 204 determines that the data combination 1 in Table 1 is the second specific data combination, the processor 204 can correspondingly determine that Pose1 (i.e., the predetermined pose of the data combination 1) in Table 1 is the second reference pose. For another example, if the processor 204 determines that the data combination 2 in Table 1 is the second specific data combination, the processor 204 can correspondingly determine that Pose2 (i.e., the predetermined pose of the data combination 2) in Table 1 is the second reference pose. For yet another example, if the processor 204 determines that the data combination 3 in Table 1 is the second specific data combination, the processor 204 can correspondingly determine that Pose3 (i.e., the predetermined pose of the data combination 3) in Table 1 is the second reference pose, but the disclosure is not limited thereto.

In step S630, the processor 204 determining, based on the first relative position RL1 and the second relative position RL2, to use the first reference pose or the second reference pose to correct the pose of the host 200.

In one embodiment, the processor 204 may determine whether the first distance D1 is smaller than the second distance D2. In response to determining that the first distance D1 is smaller than the second distance D2, the processor 204 determines to use the first reference pose to correct the pose of the host 200. On the other hand, in response to determining that the first distance D1 is not smaller than the second distance D2, the processor 204 determines to use the second reference pose to correct the pose of the host 200.

In another embodiment, the processor 204 may determine determining a second area corresponding to the second reference object 420 in the first image IM1, wherein the second area corresponding to the second reference object 420 in the first image IM1 is the an area occupied by the second reference object 420 in the first image IM1. Next, the processor 204 may determine whether the first area is larger than the second area. In one embodiment, in response to determining that the first area is larger than the second area, the processor 204 determines to use the first reference pose to correct the pose of the host 200. On the other hand, in response to determining that the first area is not larger than the second area, the processor 204 determines to use the second reference pose to correct the pose of the host 200.

In FIG. 6, after determining to use the first reference pose to correct the pose of the host 200, the processor 204 performs step S640 to correct the pose of the host 200 based on the first reference pose and neglecting the second reference pose. The details of correcting the pose of the host 200 based on the first reference pose can be referred to the above embodiments, which would not be repeated herein.

On the other hand, after determining to use the second reference pose to correct the pose of the host 200, the processor 204 performs step S650 to correct the pose of the host based on the second reference pose and neglecting the first reference pose. The details of correcting the pose of the host 200 based on the second reference pose is similar to the way of correcting the pose of the host 200 based on the first reference pose, and hence the details thereof would not be repeated herein.

Figure 8:
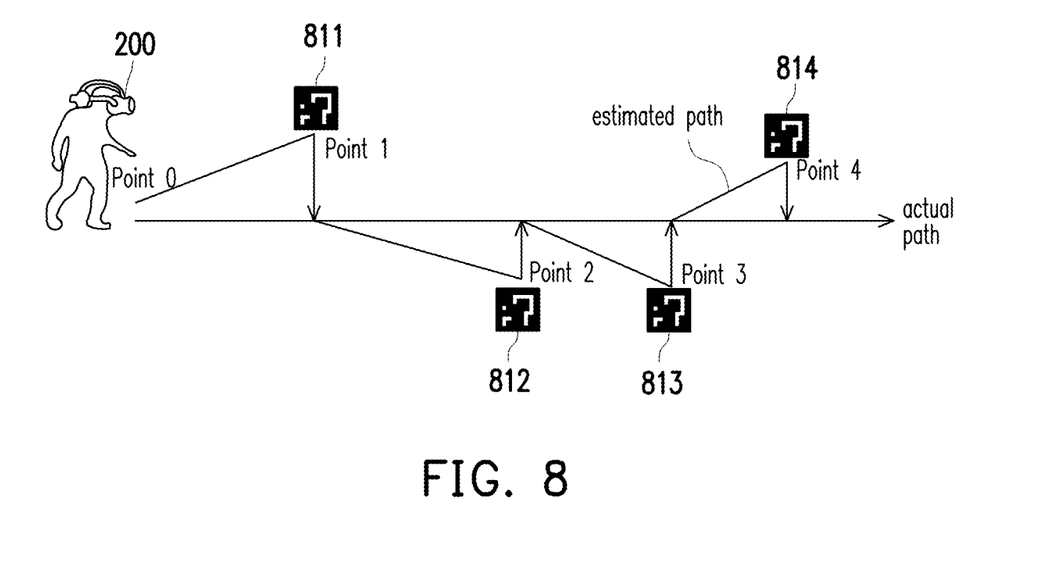
FIG. 8 shows an application scenario according to an embodiment of the disclosure.

See FIG. 8, which shows an application scenario according to an embodiment of the disclosure. In FIG. 8, assuming that the host 200 moves along the actual path. During the process of the host 200 moving from Point 0 to Point 1, the pose drifting error of the pose of the host 200 may be gradually accumulated, such that the estimated path of the host 200 gradually deviates from the actual path. However, when the host 200 reaches Point 1 and determines that the reference object 811 is detected in the captured image, the pose of the host 200 can be corrected based on the reference object 811, such that the estimated path of the host 200 can be corrected to fit the actual path at Point 1.

During the process of the host 200 moving from Point 1 to Point 2, the pose drifting error of the pose of the host 200 may be gradually accumulated, such that the estimated path of the host 200 gradually deviates from the actual path. However, when the host 200 reaches Point 2 and determines that the reference object 812 is detected in the captured image, the pose of the host 200 can be corrected based on the reference object 812, such that the estimated path of the host 200 can be corrected to fit the actual path at Point 2.

During the process of the host 200 moving from Point 2 to Point 3, the pose drifting error of the pose of the host 200 may be gradually accumulated, such that the estimated path of the host 200 gradually deviates from the actual path. However, when the host 200 reaches Point 3 and determines that the reference object 813 is detected in the captured image, the pose of the host 200 can be corrected based on the reference object 813, such that the estimated path of the host 200 can be corrected to fit the actual path at Point 3.

During the process of the host 200 moving from Point 3 to Point 4, the pose drifting error of the pose of the host 200 may be gradually accumulated, such that the estimated path of the host 200 gradually deviates from the actual path. However, when the host 200 reaches Point 4 and determines that the reference object 814 is detected in the captured image, the pose of the host 200 can be corrected based on the reference object 814, such that the estimated path of the host 200 can be corrected to fit the actual path at Point 4.

In summary, the embodiments of the disclosure can correct the pose of the host when a reference object is detected in the captured image. In this case, when the host moves around in the specific field, the pose of the host can be corrected from time to time, and hence the issue of pose drifting error accumulation mentioned in the above can be mitigated.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A method for pose correction, adapted to a host, comprising:
    capturing, by using a camera of the host, a plurality of images of an environment where the host locates;
    tracking a pose of the host via performing a tracking function based on the plurality of captured images;
    capturing, by using the camera of the host, a first image;
    in response to determining that a first reference object of at least one reference object exists in the first image, determining a first relative position between the host and the first reference object;
    obtaining a first reference pose based on the first relative position; and
    correcting the pose of the host based on the first reference pose,
    wherein before the step of obtaining the first reference pose based on the first relative position, the method further comprises:
        determining, based on the first relative position, whether the pose of the host needs to be corrected;
        in response to determining that the pose of the host needs to be corrected, obtaining the first reference pose based on the first relative position and correcting the pose of the host based on the first reference pose; and
        in response to determining that the pose of the host does not need to be corrected, not correcting the pose of the host,
    wherein the step of determining, based on the first relative position, whether the pose of the host needs to be corrected comprises:
        obtaining a first look-up table corresponding to the first reference object, wherein the first look-up table comprises a plurality of first data combinations, and each first data combination comprises a first reference relative position, a first reference area, and a first predetermined pose;
        obtaining a first specific data combination from the first data combinations based on the first relative position, wherein the first reference relative position of the first specific data combination corresponds to the first relative position;
        determining a first area corresponding to the first reference object in the first image;
        in response to determining that the first area does not correspond to the first reference area of the first specific data combination, determining that the pose of the host needs to be corrected; and
        in response to determining that the first area corresponds to the first reference area of the first specific data combination, determining that the pose of the host does not need to be corrected.

2. The method according to claim 1, wherein the first relative position between the host and the first reference object is characterized by a first distance between the host and the first reference object and a first angle of the host with respect to the first reference object.

3. The method according to claim 1, wherein the first area corresponding to the first reference object in the first image is an area occupied by the first reference object in the first image.

4. The method according to claim 1, further comprising:
    determining a time difference and accordingly obtaining a second image, wherein the second image is captured later than the first image by the time difference;
    determining whether the second image comprises the at least one reference object.

5. The method according to claim 4, further comprising:
    in response to determining that at least one image is captured between the first image and the second image, not determining whether the at least one reference object exists in each image between the first image and the second image.

6. The method according to claim 4, wherein the time difference between the first image and the second image is fixed.

7. The method according to claim 4, comprising:
    determining the time difference between the first image and the second image based on a distribution of the at least one reference object in a specific field where the host moves.

8. The method according to claim 4, comprising:
determining the time difference between the first image and the second image based on a moving speed of the host in a specific field where the host moves.

9. The method according to claim 4, comprising:
determining the time difference between the first image and the second image based on a predicted moving trace of the host.

10. The method according to claim 4, further comprising:
in response to determining that the first reference object of at least one reference object exists in the second image, determining the first relative position between the host and the first reference object;
obtaining the first reference pose based on the first relative position; and
correcting the pose of the host based on the first reference pose.

11. The method according to claim 1, wherein before the step of correcting the pose of the host based on the first reference pose, the method further comprises:
in response to determining that a second reference object of at least one reference object also exists in the first image, determining a second relative position between the host and the second reference object;
obtaining a second reference pose based on the second relative position;
determining, based on the first relative position and the second relative position, to use the first reference pose or the second reference pose to correct the pose of the host;
in response to determining to use the first reference pose to correct the pose of the host, correcting the pose of the host based on the first reference pose and neglecting the second reference pose; and
in response to determining to use the second reference pose to correct the pose of the host, correcting the pose of the host based on the second reference pose and neglecting the first reference pose.

12. The method according to claim 11, wherein the first relative position comprises a first distance between the first reference object and the host, the second relative position comprises a second distance between the second reference object and the host, and the step of determining, based on the first relative position and the second relative position, to use the first reference pose or the second reference pose to correct the pose of the host comprises:
in response to determining that the first distance is smaller than the second distance, determining to use the first reference pose to correct the pose of the host; and
in response to determining that the first distance is not smaller than the second distance, determining to use the second reference pose to correct the pose of the host.

13. The method according to claim 11, wherein the step of determining to use the first reference pose or the second reference pose to correct the pose of the host based on the first relative position and the second relative position comprises:
determining the first area corresponding to the first reference object and a second area corresponding to the second reference object in the first image;
in response to determining that the first area is larger than the second area, determining to use the first reference pose to correct the pose of the host; and
in response to determining that the first area is not larger than the second area, determining to use the second reference pose to correct the pose of the host.

14. The method according to claim 11, wherein the step of obtaining the second reference pose based on the second relative position comprises:
obtaining a second look-up table corresponding to the second reference object, wherein the second look-up table comprises a plurality of second data combinations, and each second data combination comprises a second reference relative position, a second reference area, and a second predetermined pose;
obtaining a second specific data combination from the second data combinations based on the second relative position, wherein the second reference relative position of the second specific data combination corresponds to the second relative position; and
determining the second predetermined pose of the second data combination as the second reference pose.

15. The method according to claim 1, wherein the step of correcting the pose of the host based on the first reference pose comprises:
obtaining at least one difference between the pose of the host and the first reference pose; and
compensating the pose of the host by the at least one difference.

16. The method according to claim 15, wherein the at least one difference is characterized by at least one component difference on at least one degree of freedom between the pose of the host and the first reference pose.

17. A host, comprising:
a non-transitory storage circuit, storing a program code; and
a processor, coupled to the non-transitory storage circuit and accessing the program code to perform:
capturing, by using a camera of the host, a plurality of images of an environment where the host locates;
tracking a pose of the host via performing a tracking function based on the plurality of captured images;
capturing, by using the camera of the host, a first image;
in response to determining that a first reference object of at least one reference object exists in the first image, determining a first relative position between the host and the first reference object;
obtaining a first reference pose based on the first relative position; and
correcting a pose of the host based on the first reference pose,
wherein before obtaining the first reference pose based on the first relative position, the method further comprises:
determining, based on the first relative position, whether the pose of the host needs to be corrected;
in response to determining that the pose of the host needs to be corrected, obtaining the first reference pose based on the first relative position and correcting the pose of the host based on the first reference pose; and
in response to determining that the pose of the host does not need to be corrected, not correcting the pose of the host,
wherein the step of determining, based on the first relative position, whether the pose of the host needs to be corrected comprises:
obtaining a first look-up table corresponding to the first reference object, wherein the first look-up table comprises a plurality of first data combinations, and each first data combination comprises a first reference relative position, a first reference area, and a first predetermined pose;

obtaining a first specific data combination from the first data combinations based on the first relative position, wherein the first reference relative position of the first specific data combination corresponds to the first relative position;

determining a first area corresponding to the first reference object in the first image;

in response to determining that the first area does not correspond to the first reference area of the first specific data combination, determining that the pose of the host needs to be corrected; and in response to determining that the first area corresponds to the first reference area of the first specific data combination, determining that the pose of the host does not need to be corrected.

* * * * *